No. 751,243. PATENTED FEB. 2, 1904.
W. L. AUSTIN.
MOTOR TRUCK.
APPLICATION FILED JULY 6, 1903.
NO MODEL.
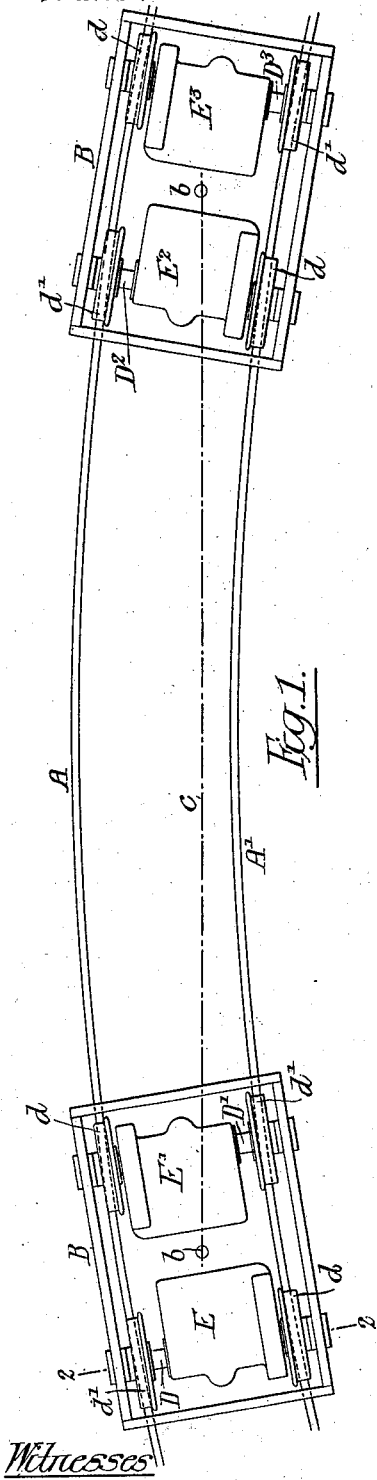
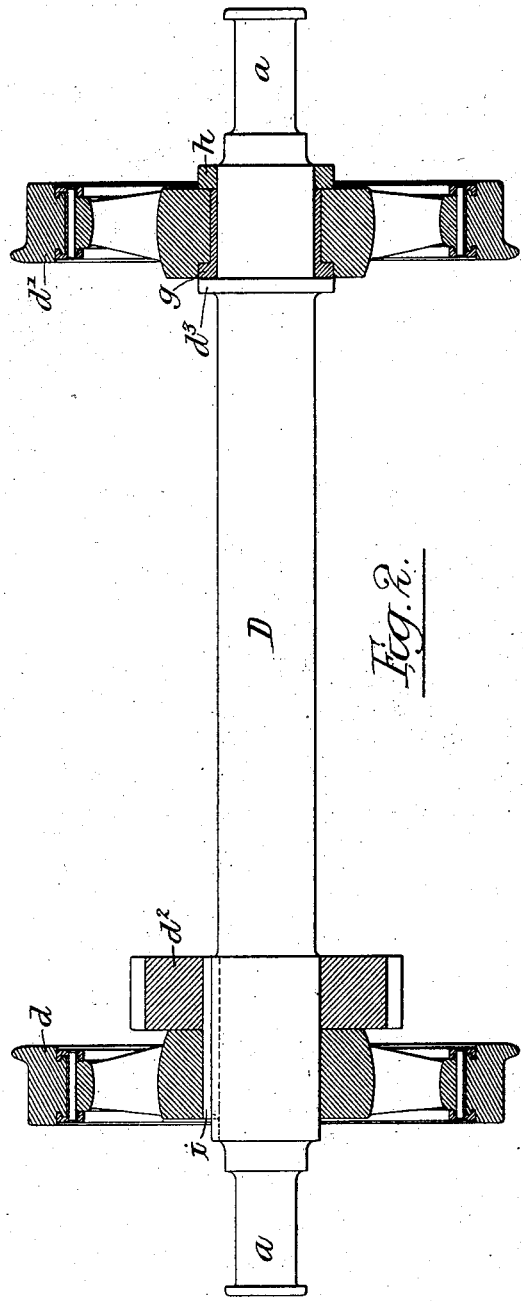

No. 751,243. Patented February 2, 1904.

UNITED STATES PATENT OFFICE.

WILLIAM L. AUSTIN, OF PHILADELPHIA, PENNSYLVANIA, ASSIGNOR TO BURNHAM, WILLIAMS & COMPANY, OF PHILADELPHIA, PENNSYLVANIA, A FIRM.

MOTOR-TRUCK.

SPECIFICATION forming part of Letters Patent No. 751,243, dated February 2, 1904.

Application filed July 6, 1903. Serial No. 164,430. (No model.)

*To all whom it may concern:*

Be it known that I, WILLIAM L. AUSTIN, a citizen of the United States, residing in Philadelphia, Pennsylvania, have invented certain Improvements in Motor-Trucks, of which the following is a specification.

The object of my invention is to prevent the dragging of the wheels of a motor car-truck in passing around curves. Heretofore it has been a common practice to attach all the wheels of the truck rigidly to their axles, so that they will all turn at the same speed. Consequently in passing around curves the wheels taking the outer curve travel over a greater length of rail than those taking the inner curve. Therefore the wheels must slip to compensate for this difference. In ordinary railway practice this is not noticed to such a degree as in street-railway practice, where the curves are very sharp and the wear is consequently excessive. Furthermore, the noise or screeching when the car passes around a curve is very annoying. The slipping of the wheels on the rails causes the wheels to flatten in places, and the consequence is that every few days the wheels have to be detached from the trucks and turned true.

By my invention I avoid the above-described disadvantages.

In the accompanying drawings, Figure 1 is a plan view showing two motor-trucks mounted on a curved track, the car-frame being omitted in order to avoid confusion. Fig. 2 is a transverse sectional view on the line 2 2, Fig. 1.

A A' are the rails of the track, A being the outer curved rail and A' the inner curved rail.

B B' are two four-wheel truck-frames pivoted at $b$ to the car-frame, the center line of which is indicated by the line $c$. The trucks and the frame may be made in any suitable manner without departing from the main feature of my invention.

D D' are the axles of the truck B, and $D^2$ $D^3$ are the axles of the truck B'. Secured rigidly to the axles D D' $D^2$ $D^3$ are driving-wheels $d$, and mounted loosely on the ends of the axles above referred to are the traction-wheels $d'$. Hung from the axles and suspended from the car in the usual manner are independent motors E E' $E^2$ $E^3$, mounted on their respective axles and geared thereto in the ordinary manner, so that each axle is driven from its own motor.

I preferably alternate the driving-wheels and loose wheels on each axle, as shown in the drawings. The driving-wheel $d$ of the axle D is on one side of the truck, while the driving-wheel $d$ of the axle D' is on the opposite side of the truck, the same as the driving-axles of the truck B'.

The motors in this construction need not be as powerful as the motors used when only the front truck has driven wheels, as in the present type of motor-car power is distributed, each axle being driven.

It will be noticed that when the car is traveling on a straight track all the wheels turn in unison and there is practically no movement of the loose wheel on the axle; but when the car strikes a curve the loose wheel of one set of axles will travel faster than the axle and on the other side slower than the axle, according to the radius of the curve, so that there is no slip of the wheels on the track in the car passing around the curve, the slip taking place between the axle and the loose wheel.

I prefer to mount the loose wheel as shown in Fig. 2. In this view the rigid driving-wheel $d$ is keyed to the axle by a key $i$, which key also secures the gear-wheel or pinion $d^2$ to the axle D.

The loose wheel $d'$ is preferably provided with a bushing $g$, which fits snugly on the axle, and the wheel rests against a collar or shoulder $d^3$, formed on the axle. A loose collar $h$ can be attached to the outer end of the axle in any suitable manner, either clamped thereon or secured by a set-screw or shrunk thereon sufficient to hold the wheel in place on the axle, but allow it to turn freely. The strain on this collar is not great, as the flange of the wheel bearing upon the rail will keep the wheel always against the fixed collar $d^3$.

The axle has the usual reduced bearing portions $a$ $a$ beyond the wheels, which are mounted in the usual boxes carried by the truck, so that the axle turns freely in the boxes, and there is a slight movement of the loose wheel in respect to the shaft when the car strikes a curve.

I have shown the wheel provided with a detachable tire; but it will be understood that a solid wheel may be used—in fact, any type of wheel can be used without departing from my invention.

While I have shown my invention as applied to a car having two four-wheel trucks, each provided with a motor, it will be understood that my invention can be applied to a four-wheel car in which the truck forms a rigid portion of the car, the motor driving each axle, or the front or rear four-wheel truck may be provided with motors, as shown in the drawings, and the other trucks may be plain, and a six-wheel truck may be used, if desired.

I claim as my invention—

1. The combination of a truck, axles thereon, a motor geared to each axle, a driving-wheel secured to each axle and a traction-wheel loose on each axle, substantially as described.

2. The combination of a truck, two axles thereon, two motors, one motor geared to one axle and the other motor geared to the other axle, a wheel secured to each axle, and a wheel loose on each axle, substantially as described.

3. The combination of a motor-car having two four-wheel trucks, axles on said trucks, a motor geared to each axle, one wheel of each axle being secured thereto and the other wheel being loose thereon, substantially as described.

4. The combination of a four-wheel truck, two axles mounted thereon, two motors, one motor geared to one axle the other motor geared to the other axle, a wheel rigidly secured to each axle, and a wheel loose on each axle, the rigid wheel of one axle being on one side of the truck and the rigid wheel of the other axle being on the other side of the truck, substantially as described.

5. The combination of a motor-car, two four-wheel trucks supporting the same, two axles on each truck, two motors on each truck, one motor geared to one axle the other motor geared to the other axle, a driving-wheel rigidly secured to each axle, and a loose wheel mounted on each axle, the said wheels being alternately arranged so that there will be a driving-wheel and a loose wheel on each side of each truck, substantially as described.

In testimony whereof I have signed my name to this specification in the presence of two subscribing witnesses.

WM. L. AUSTIN.

Witnesses:
   FRED. WOOLLNER,
   KENNETH RUSHTON.